United States Patent [19]

Chen

[11] Patent Number: 5,566,790

[45] Date of Patent: Oct. 22, 1996

[54] BICYCLE BRAKE ASSEMBLY

[76] Inventor: Tsung-I Chen, 58 Ma Yuan West St., Taichung, Taiwan

[21] Appl. No.: 554,964

[22] Filed: Nov. 13, 1995

[51] Int. Cl.⁶ ........................................... B62L 1/06
[52] U.S. Cl. ................. 188/24.16; 74/89.22; 74/502.2
[58] Field of Search ........................ 188/24.14, 24.15, 188/24.16, 24.22, 2 D, 72.7; 74/89.22, 502.2, 110

[56] References Cited

U.S. PATENT DOCUMENTS

| | | | |
|---|---|---|---|
| 3,961,691 | 6/1976 | Eng | 188/24.11 |
| 4,753,448 | 6/1988 | Nagashima | 188/24.22 X |
| 4,773,510 | 9/1988 | Sato | 188/2 D X |
| 4,817,452 | 4/1989 | Burkey | 188/2 D X |
| 5,339,929 | 8/1994 | Chern | 188/24.16 |

Primary Examiner—Josie Ballato

[57] ABSTRACT

A bicycle brake assembly comprises a main frame, a retaining ring, a rotor and a pair of pintles. A hollow shaft is on the main frame. The first, second and third lugs are on the main frame. Each lug has a hole. The hollow shaft is inserted in the center hole of the hollow rotor. Two recesses are formed on the rotor to receive the heads of the front and rear brake lines. The rotor has two chambers defined by the flanges at the opposite sides of the rotor. The first and second pintles are disposed on the corresponding chambers, respectively. Each pintle has a slot and a circular hole at each end of the pintle, respectively. The bottom circular hole receives a hollow cylinder post. A hollow screw which has a through hole passes through the bottom slot and the hollow cylinder post. One end of the first or second brake control line is positioned by the positioning hole of the screw bolt. The screw bolt passes through a washer, a nut, and the through hole.

1 Claim, 2 Drawing Sheets

5,566,790

BICYCLE BRAKE ASSEMBLY

BACKGROUND OF THE INVENTION

The invention relates to a bicycle brake. More particularly, the invention relates to a bicycle brake assembly which can use a single lever to brake the front brake and the rear brake.

A conventional bicycle brake device has to apply the left lever and the right lever in order to brake the front brake and the rear brake simultaneously.

SUMMARY OF THE INVENTION

An object of the invention is to provide a bicycle brake assembly which can brake the front brake and the rear brake simultaneously with a single lever.

Accordingly, a bicycle brake assembly comprises a main frame, a retaining ring, a rotor and a pair of pintles. The retaining ring is disposed at the rear portion of the main frame. A hollow shaft extends from the right surface of the main frame. The first, second and third lugs are disposed at the right surface of the main frame. Each lug has a hole thereon. The front brake line passes through the first lug. The rear brake line passes through the second lug. The first and second brake control lines pass through the third lug. The hollow shaft is inserted in the center hole of the hollow rotor. A first recess is formed on the rotor to receive the front head of the front brake line. The second recess is formed on the rotor to receive the rear head of the rear, brake line. The rotor has two opposite chambers defined by the corresponding flanges at the opposite sides of the rotor. The first and second pintles are disposed on the corresponding chambers, respectively. Each pintle has a slot and a bottom circular hole at each end of the pintle, respectively. The bottom circular hole receives a hollow cylinder post. A hollow screw which has a through hole passes through the bottom slot and the hollow cylinder post so that the hollow screws can rotate with the cylinder post. The first and second brake control lines pass through the corresponding through holes, respectively. One end of the first or second brake control line is positioned by the positioning hole of the screw bolt. The screw bolt passes through a washer, a nut, and the through hole. The coiled springs are disposed between the corresponding pintles and the rotor, respectively, to direct the pintles to move toward the corresponding flanges. A positioning plate which has a hole is connected to the rotor with a bolt. A spring which is disposed between the rotor and the positioning plate is passed through by the bolt.

DETAILED DESCRIPTION OF THE INVENTION

Figure 1:
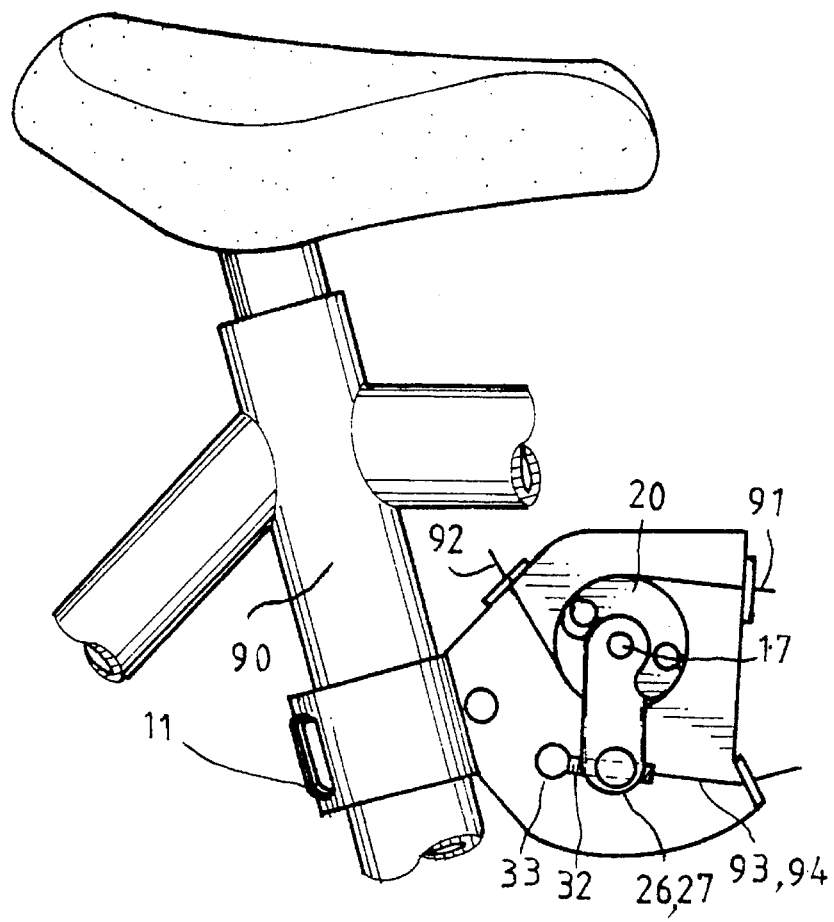
FIG. 1 is a schematic view of mounting a bicycle brake assembly on a bicycle in accordance with the invention.
Figure 2:
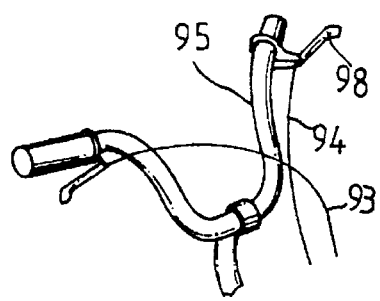
FIG. 2 is a partly perspective view of a bicycle handle.
Figure 3:
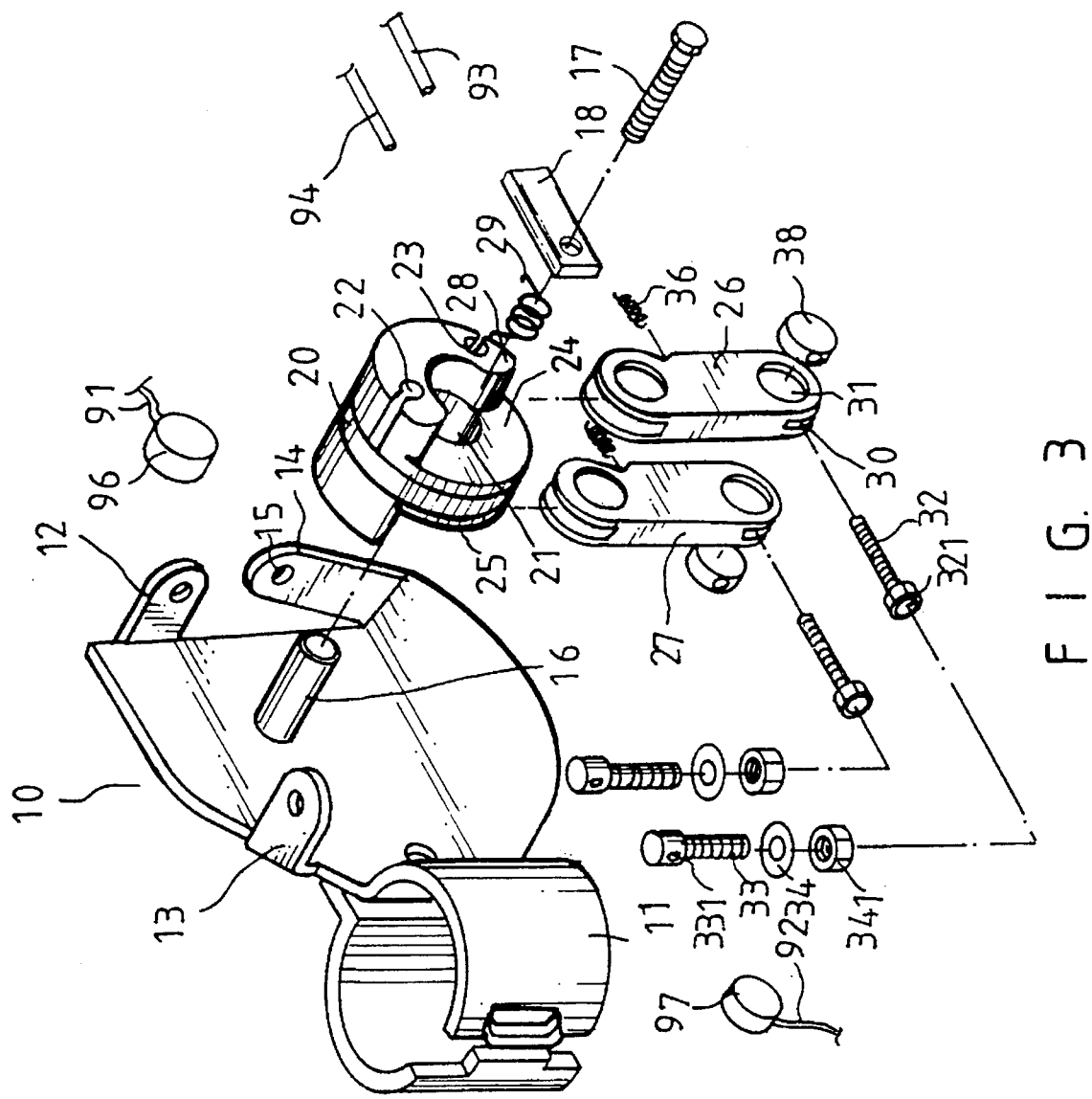
FIG. 3 is a perspective exploded view of a bicycle brake assembly.

Referring to FIG. 3, a bicycle brake assembly comprises a main frame 10, a retaining ring 11, a rotor 20 and a pair of pintles 26 and 27. The retaining ring 11 is disposed at the rear portion of the main frame 10 to embrace a seat tube 90. A hollow shaft 16 extends from the right surface of the main frame 10. The first, second and third lugs 12, 13 and 14 are disposed at the right surface of the main frame 10. Each lug 12, 13 and 14 has a hole 15 thereon. Referring to FIGS. 1 to 3, the front brake line 91 passes through the first lug 12. The rear brake line 92 passes through the second lug 13. The first and second brake control lines 93 and 94 pass is through the third lug 14. The hollow shaft 16 is inserted in the center hole 21 of the hollow rotor 20. A first recess 22 is formed on the rotor 20 to receive the front head 96 of the front brake line 91. The second recess 23 is formed on the rotor 20 to receive the rear head 97 of the rear brake line 92. Thus the heads 96 and 97 can rotate with the rotor 20 simultaneously. The rotor 20 has two opposite chambers 24 and 25 defined by the corresponding flanges 28 at the opposite sides of the rotor 20. The first and second pintles 26 and 27 are disposed on the corresponding chambers 24 and 25, respectively. Each pintle 26 or 27 has a slot 30 and a circular hole 31 at each end of the pintle 26 or 27, respectively. The bottom circular hole 31 receives a hollow cylinder post 38. A hollow screw 32 which has a through hole 321 passes through the bottom slot 30 and the hollow cylinder post 38 so that the hollow screws 32 can rotate with the cylinder post 38. The first and second brake control lines 93 and 94 pass through the corresponding through holes 321, respectively. One end of the first or second brake control line 93 or 94 is positioned by the positioning hole 331 of the screw bolt 33. The screw bolt passes through a washer 34, a nut 341, and the through hole 321. The springs 36 are disposed between the corresponding pintles 26 and 27 and the rotor 20, respectively, to direct the pintles 26 and 27 to move toward the corresponding flanges 28. A positioning plate 18 which has a hole is connected to the rotor 20 with a bolt 17. A spring 29 which is disposed between the rotor 20 and the positioning plate 18 is passed through by the bolt 17. The flanges 28 can block the corresponding plates 26 and 27, respectively. When the left lever 98 is grasped toward the left handle 95, the rotor 20 is rotated and the second pintle 27 is operated. The first pintle 26 is released by the spring 36 to leave the flange 28.

The invention is not limited to the above embodiment but various modification thereof may be made. It will be understood by those skilled in the art that various changes in form and detail may be made without departing from the scope of the invention.

I claim:

1. A bicycle brake assembly comprising:

a main frame;

a retaining ring disposed at a rear portion of said main frame;

a hollow shaft extending from the right surface of said main frame;

a first, second and third lugs disposed at the right surface of said main frame;

each of said lugs having a hole thereon;

a front brake line passing through said first lug;

a rear brake line passing through said second lug;

a first and second brake control lines passing through said third lug;

said hollow shaft inserted in a center hole of a hollow rotor;

a first recess formed on said rotor to receive a front head of said front brake line;

a second recess formed on said rotor to receive a rear head of said rear brake line;

said rotor having two opposite chambers defined by corresponding flanges at the opposite sides of the rotor, respectively;

a first and second pintles disposed on said corresponding chambers, respectively;

each said pintle having a slot and a bottom circular hole at each end of said pintle, respectively;

each said bottom circular hole receiving a hollow cylinder post;

a hollow screw which has a through hole passing through said bottom slot and said hollow cylinder post;

said first and second brake control lines passing through said corresponding through holes, respectively;

one end of each of said brake control lines positioned by a positioning hole of a screw bolt;

said screw bolt passing through a washer, a nut, and said through hole;

two coiled springs disposed between said corresponding pintles and said rotor, respectively;

a positioning plate which has a hole connected to said rotor with a bolt; and a spring which is disposed between said rotor and said positioning plate passed through by said bolt.

* * * * *